B. F. ST. JOHN.
Pendulum Level.
No. 49,802.
Patented Sept. 5, 1865.
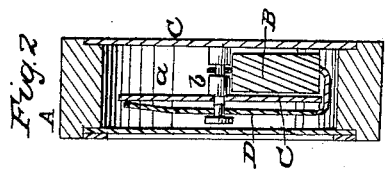
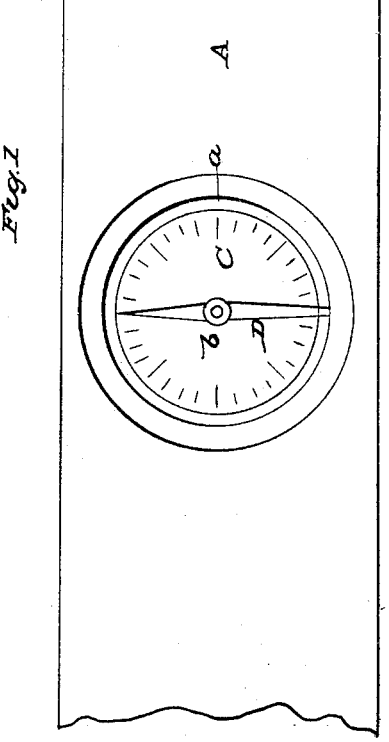
WITNESSES
W. Trewin.
Thos. Fusch
INVENTOR
B F St John,
By Munn & Co.
Attys

UNITED STATES PATENT OFFICE.

B. F. ST. JOHN, OF SHELBYVILLE, INDIANA.

IMPROVEMENT IN PENDULUM-LEVELS.

Specification forming part of Letters Patent No. 49,802, dated September 5, 1865.

*To all whom it may concern:*

Be it known that I, B. F. ST. JOHN, of Shelbyville, in the county of Shelby and State of Indiana, have invented a new and Improved Pendulum-Level; and I do hereby declare that the following is a full, clear, and exact description thereof, which will enable those skilled in the art to make and use the same, reference being had to the accompanying drawings, forming part of this specification, in which—

Figure 1 represents a front elevation of this invention. Fig. 2 is a transverse vertical section of the same.

Similar letters of reference indicate corresponding parts.

This invention relates to an improvement in that class of levels in which the position of the index-hand is governed by the action of a weight which swings on an axle or stem. In the level which forms the subject-matter of this present invention the dial, the weight, and the index-hand are all connected to the same central shaft or stud, the dial being stationary and the weight with the index-hand movable. The index-hand is secured to the weight, which is situated behind the dial, and it (the hand) is bent so as to extend in front of the dial and show the position of the weight. By this arrangement the construction of the level is greatly facilitated, and the index-hand, being made to extend from the extreme end of the weight, is made to show the slightest change in the position of said weight.

A represents the stock of my level, which is made of wood or any other suitable material. This stock is provided with a recess or hole, *a*, which is intended to receive the pendulum B and the dial C. The pendulum is suspended from a stud, *b*, which is firmly secured in the back plate, *c*, and secured to this stud is the dial C. Said dial is stationary, and it is marked with the requisite scale to indicate the position of the pendulum B. From the extreme end of the pendulum extends the index-hand D, as clearly shown in the drawings. This index-hand is bent round the edge of the dial-plate, and it is guided by the outer end of the stud *b*.

Whenever the pendulum swings on the stud in either direction the index-hand is compelled to follow and to indicate the position of said pendulum on the dial. The connection between the pendulum and the index is thus effected in a very simple manner. No sleeve or other device is required which creates unnecessary friction, and the index-hand extends from the extreme end of the pendulum, so that it is compelled to show the slightest change in the position of the same.

The whole mechanism is attached to the stud *b* and back plate, *c*, and it can be readily attached to a stock of any desired description. It is simple, cheap, and it is not liable to get out of order, and works with the requisite accuracy for all practical purposes.

I claim as new and desire to secure by Letters Patent—

The index-hand D, extending from the extreme end of the pendulum B and bent round the edge of the dial C, in combination with the central stud, *b*, constructed and operating as and for the purpose set forth.

B. F. ST. JOHN.

Witnesses:
JOHN L. MONTGOMERY,
Z. U. SMITH.